United States Patent [19]

Takayama

[11] Patent Number: 4,938,308
[45] Date of Patent: Jul. 3, 1990

[54] INERTIAL RUNNING ENERGY STORAGE DEVICE FOR VEHICLES

[76] Inventor: Masaru Takayama, No. 4-43, Kamishinozaki-cho, Edogawa-ku, Tokyo, Japan

[21] Appl. No.: 241,475

[22] Filed: Sep. 8, 1988

[30] Foreign Application Priority Data

Jul. 2, 1988 [JP] Japan .................... 63-165482

[51] Int. Cl.⁵ .................... B60K 25/10; B60S 9/10
[52] U.S. Cl. .................... 180/165; 180/219; 280/764.1
[58] Field of Search ............... 180/165, 219; 280/293, 280/764.1; 60/408

[56] References Cited

U.S. PATENT DOCUMENTS

| | | | |
|---|---|---|---|
| 1,300,772 | 4/1919 | Purdy | 280/293 |
| 2,300,762 | 11/1942 | Andrews | 180/219 |
| 2,960,351 | 11/1960 | Jeffress | 280/293 |
| 3,980,150 | 9/1976 | Gigli | 280/293 X |
| 4,223,906 | 9/1980 | Gratza | 180/219 X |

FOREIGN PATENT DOCUMENTS

| | | | |
|---|---|---|---|
| 2658056 | 7/1978 | Fed. Rep. of Germany | 280/293 |
| 0094824 | 5/1985 | Japan | 180/165 |

*Primary Examiner*—Charles A. Marmor
*Assistant Examiner*—Brian L. Johnson
*Attorney, Agent, or Firm*—Fleit, Jacobson, Cohn, Price, Holman & Stern

[57] ABSTRACT

An inertial energy storage device for vehicles in which heretofore completely disregarded inertial energy available when the brakes are applied can be utilized for various useful purposes such as assisting a driver in raising the stand of a motorcycle or starting the engine of an automotive vehicle.

1 Claim, 1 Drawing Sheet

INERTIAL RUNNING ENERGY STORAGE DEVICE FOR VEHICLES

BACKGROUND OF THE INVENTION (1) Field of the Invention

The present invention relates to an inertial running energy storage device of the type for storing the inertial energy available from the time when a brake is applied to stop a vehicle such as a motorcycle, an automotive vehicle, an electric car or the like so that the stored inertial energy can be used for suitable purposes.

(2) Description of the Prior Art

Heretofore, inertial running energy available from the time when a brake is applied to slow a vehicle running on the ground until the time it is stopped has not been taken into consideration and is dissipated and lost.

SUMMARY OF THE INVENTION:

In view of the above, the present invention was made to utilize the inertial running energy available when a brake is applied to a ground vehicle. This inertial running energy has not been used heretofore as described above. The stored inertial energy is used, for instance, to return a motorcycle to its running position or as an auxiliary force for starting the engine of an automotive vehicle.

To this end, according to the present invention, part of the inertial running energy available from the time when brakes are applied to the wheels of a running ground vehicle until the time when it runs a certain distance and is stopped, is derived and stored so that the stored inertial energy can be utilized for various purposes. The primary object of the present invention is therefore to provide a device capable of storing the inertial running energy available from a ground vehicle when the brakes are applied.

The above and other objects, effects, features and advantages of the present invention will become more apparent from the following description of a preferred embodiment thereof taken in conjunction with the accompanying drawing.

BRIEF DESCRIPTION OF THE DRAWING

The single FIG. is a schematic view illustrating the operating system of a preferred embodiment of an inertial energy storage device in accordance with the present invention.

DETAILED DESCRIPTION OF THE PREFERRED EMBODIMENT

Figure 1:
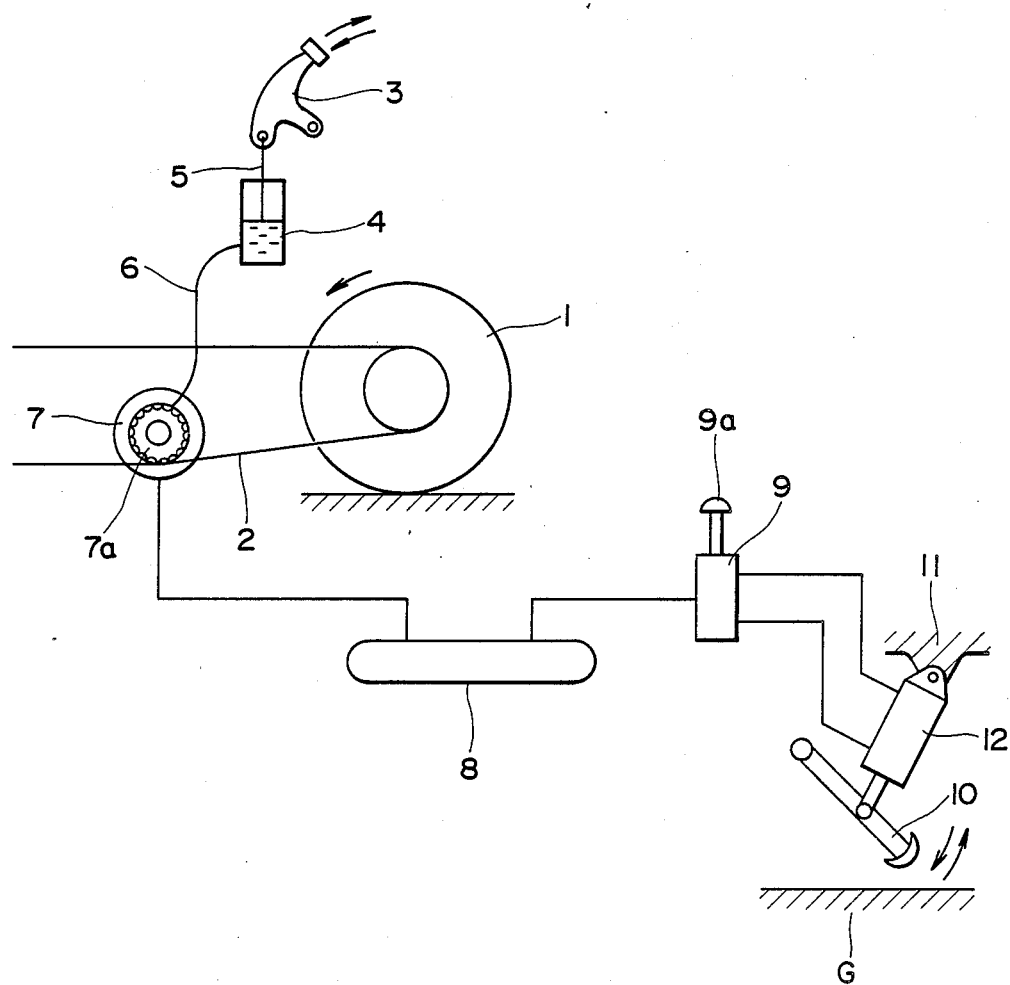

The present invention will now be explained in detail.

The single FIG. is a schematic view illustrating the operating system of an inertial energy storage device in accordance with the present invention as it is applied to a motorcycle. Reference numeral 1 designates a wheel of the motorcycle which is interconnected with the motorcycle engine (not shown) and rotated by a chain 2. Chain 2 is connected to a gear of an engine (not shown). In this embodiment, the chain 2 always moves in synchronism with the rotation of the wheel 1. A known idling mechanism is not interposed between the wheel 1 and the chain 2, but is interposed between the engine (not shown) and the chain 2.

Reference numeral 3 denotes a brake pedal which not only has the essential function of applying brakes (not shown) to wheel 1 but also is connected to a piston rod 5 of a preferably liquid filled, first cylinder 4 which in turn is connected in a conventional manner through a pipe or conduit 6 to a clutch portion 7a of a compressor 7.

When the brake pedal 3 is depressed, therefore, it accomplishes its essential function of applying the brakes and simultaneously activates the first cylinder 4 so that the clutch portion 7a interconnects the chain 2 and the compressor 7 and, consequently, air is charged into and stored in an air tank 8.

Therefore, simultaneously with the depression of the brake pedal 3, the compressor 7 is activated so that the compressed air is forced into the air tank 8 by compressor 7.

Reference numeral 9 indicates a directional control valve or a selector which communicates not only with the air tank 8 but also with a cylinder 12 interposed between a stand 10 and a connection point 11 on the main body of the motorcycle. As the stand 10 is initially raised away from the ground G, compressed air is charged into the cylinder 12, thereby assisting an operator in raising the stand 10 away from the ground. Furthermore, according to the present invention, as the stand 10 is initially lowered from its running position, the cylinder 12 is operated in a manner opposite to that described above.

In an inertial energy storage device with the above-described construction, brakes are applied by pedal 3 in order to control the speed of the running motorcycle. Thus, not only are braking forces applied to the wheels of the motorcycle, but the cylinder 4 is also simultaneously activated so that the clutch portion 7a is interconnected with chain 2 and the compressor 7 is also activated. As a result, the compressed air is charged into and stored in the air tank. When the brake pedal is released, the cylinder 4 is returned to its initial state so that the above described operation is stopped and compressed air is no longer charged into the air tank.

When the brakes are applied, compressed air is always charged into and stored in the air tank 8 as described above. Of course, air tank 8 is equipped with a relief valve so that when the pressure of the compressed air stored in the air tank 8 exceeds a predetermined pressure, the compressed air is automatically discharged out of the air tank 8 by the relief valve.

Thus, when the motorcycle is stopped, as the stand 10 of the motorcycle is initially raised away from the ground G so that the motorcycle can run, the actuating rod 9a of the directional control or selector valve 9 is pushed down so that compressed air flows from air tank 8 into the cylinder 12. As a result, the piston rod of the cylinder 12 is withdrawn into the cylinder 12 to assist in raising the stand 10 away from the ground G.

Therefore, the compressed air released from tank 8 into cylinder 12 assists in raising the stand 10 at the moment when the greatest force is required to do so.

Furthermore, after the stand 10 has been raised and inclined so that the motorcycle has become ready to run, in order to again completely lower the stand 10 to park the motorcycle, the driver must temporarily raise the main body. In this case, the driver is required to exert considerable force. However, according to the present invention, in order to assist the driver in lowering stand 10, the selector valve 9 is also pushed from its neutral position so that the movement of the piston rod of the cylinder 12 is reversed and the piston rod is extended out of the cylinder 12, thereby adding auxiliary force to that provided by the driver.

So far the present invention has been described in conjunction with a motorcycle, but it is of course to be understood that the present invention may be equally applied to other ground vehicles such as automotive vehicles and the like so that inertial running energy available when the brakes are applied is stored in order to utilize the stored inertial energy for various auxiliary purposes.

As described above, according to the present invention, part of the inertial energy available when the brakes are applied and which heretofore has not been utilized at all and wasted is recovered and stored. The recovered and stored inertial energy can be utilized to provide auxiliary forces in various operations and especially in case of an operation requiring human power such as that disclosed. Furthermore, the inertial energy storage device in accordance with the present invention enhances the braking action when the brakes are applied. Thus, the inertial energy storage device in accordance with the present invention serves a double purpose and therefore greatly contributes to the technology.

While there has been described what is at present considered to be a preferred embodiment of the present invention, it will be understood that various modifications may be made thereto, and it is intended that the appended claims cover all such modifications within the true spirit and scope of the present invention.

I claim:

1. An inertial running energy storage device for vehicles comprising:
   chain means for interconnecting a wheel to an engine of a vehicle so that said wheel can be driven by said engine for rotation;
   brake means for applying a brake to said wheel;
   a first cylinder;
   a first piston rod connected to the brake means and being slidably mounted in said first cylinder;
   a compressor including a clutch portion,
   means for interconnecting said first cylinder with said clutch portion so that upon application of the brake means and thereby simultaneous movement of said first piston rod within said first cylinder, said clutch portion is moved such that said chain means is engaged to thereby activate said compressor;
   an air tank storing compressed air forced by said compressor into said air tank when said compressor is activated;
   a conduit connected to said air tank and said compressor.
   a stand pivotably connected to the vehicle for movement between a raised, running position and a lowered, parking position;
   a second cylinder pivotably connected to a connection point on the body of said vehicle;
   a second piston rod being pivotably connected to said stand and being slidably mounted in said second cylinder to pivot said stand between said raised position and said lowered position;
   a directional control valve for supplying compressed air from said air tank to opposite ends of said second cylinder so that said second piston rod can be selectively moved into and out of said second cylinder to force the pivoting of said stand toward said raised position and said lowered position, respectively, and
   an actuating rod for controlling the release of compressed air to each end of said second cylinder.
   a conduit connected to said air tank and said directional control valve.
   two conduits interconnecting said directional control valve and said second cylinder to provide fluid communication therebetween and controlled movement of said second piston rod.

* * * * *